(12) United States Patent
Rosin et al.

(10) Patent No.: US 9,964,247 B2
(45) Date of Patent: May 8, 2018

(54) PLUG-IN CONNECTION FOR TWO PIPES AND METHOD FOR ASSEMBLING THE PLUG-IN CONNECTION

(71) Applicant: Fraenkische Industrial Pipes GmbH & Co. KG., Koenigsberg (DE)

(72) Inventors: Volker Rosin, Wittingen (DE); Soeren Schroeter, Hallstadt (DE)

(73) Assignee: Fraenkische Industrial Pipes GmbH & Co. KG, Koenigsberg (DE)

( * ) Notice: Subject to any disclaimer, the term of this patent is extended or adjusted under 35 U.S.C. 154(b) by 317 days.

(21) Appl. No.: 14/843,056

(22) Filed: Sep. 2, 2015

(65) Prior Publication Data
US 2015/0377396 A1    Dec. 31, 2015

Related U.S. Application Data

(63) Continuation of application No. PCT/IB2014/059200, filed on Feb. 24, 2014.

(30) Foreign Application Priority Data

Mar. 7, 2013   (DE) .................. 10 2013 102 252

(51) Int. Cl.
   *F16L 37/00*   (2006.01)
   *F16L 37/14*   (2006.01)
   *F16L 21/035*  (2006.01)
(52) U.S. Cl.
   CPC ........... *F16L 37/144* (2013.01); *F16L 21/035* (2013.01)

(58) Field of Classification Search
   CPC ......... F16L 21/035; F16L 21/08; F16L 37/08; F16L 37/142; F16L 37/144; F16L 37/0841; F16L 37/088; F16L 37/091
   (Continued)

(56) References Cited

U.S. PATENT DOCUMENTS 4,244,608 A   1/1981   Stuemky
4,453,747 A   6/1984   Bimba
(Continued)

FOREIGN PATENT DOCUMENTS

CN   1148146 A   4/1997
CN   1795354 A   6/2006
(Continued)

OTHER PUBLICATIONS

Chinese Search Report dated from CN 2014800126099 dated May 24, 2016.
(Continued)

*Primary Examiner* — Aaron M Dunwoody
(74) *Attorney, Agent, or Firm* — Patentbar International, P.C.

(57) ABSTRACT

The invention relates to a plug-in connection for a first pipe and a second pipe and use thereof in a motor vehicle. A free end segment of the first pipe and a free end segment of the second pipe can be connected to each other. A retaining clip having two legs, which each bear a respective locking element, sits in a guide for the retaining clip, wherein the guide is formed on the free end segment of the first pipe. The retaining clip mounted in the guide interacts with the retaining region on the free end segment of the second pipe in a form-fitting and force-fitting manner by means of each of the locking elements.

10 Claims, 5 Drawing Sheets

(58) Field of Classification Search
USPC .................................................. 285/305, 319
See application file for complete search history.

(56) References Cited

U.S. PATENT DOCUMENTS

| | | | | |
|---|---|---|---|---|
| 5,238,221 A | * | 8/1993 | Schwaderer | .......... F16L 37/084 |
| | | | | 251/354 |
| 5,269,571 A | | 12/1993 | Haggard | |
| 5,607,190 A | * | 3/1997 | Exandier | ............. F16L 37/0985 |
| | | | | 285/308 |
| 5,607,192 A | | 3/1997 | Lee | |
| 2014/0209074 A1 | * | 7/2014 | Kahle | ................... F16L 21/035 |
| | | | | 123/572 |
| 2016/0281894 A1 | * | 9/2016 | Freter | ................. F16L 37/0841 |

FOREIGN PATENT DOCUMENTS

| | | |
|---|---|---|
| CN | 101014798 A | 8/2007 |
| DE | 3440753 A1 | 5/1986 |
| DE | 3440783 A1 | 5/1986 |
| DE | 4429498 C1 | 8/1995 |
| DE | 19713446 A1 | 10/1998 |
| DE | 19946260 C1 | 1/2001 |
| EP | 1526320 A1 | 4/2005 |
| EP | 1559944 A1 | 8/2005 |
| EP | 2012052 A1 | 1/2009 |
| JP | 2002276878 A | 9/2002 |
| KR | 20-1997-0043556 | 7/1997 |

OTHER PUBLICATIONS

International Search Report from PCT/IB2014/059200, filed Feb. 24, 2014, dated Jun. 6, 2014.

\* cited by examiner

PLUG-IN CONNECTION FOR TWO PIPES AND METHOD FOR ASSEMBLING THE PLUG-IN CONNECTION

RELATED APPLICATIONS

This Application is a Continuation application of International Application PCT/IB2014/059200, filed Feb. 24, 2014, which in turn claims priority to German Patent Application DE 10 2013 102 252.9, filed Mar. 7, 2013, both of which are incorporated herein by reference in their entirety.

FIELD OF THE INVENTION

The invention refers to a plug-in connection for a first pipe and a second pipe. In particular, a free end segment of the first pipe is received in the free end segment of the second pipe. Accordingly a retaining clip with two legs, each bears a locking element, is provided. At the free end segment of the first pipe a guide is provided for the retaining clip.

In addition, the invention refers to a method for assembling and disassembly of the plug-in connection for a first and a second pipe.

BACKGROUND OF THE INVENTION

The German patent DE 44 29 498 C 1 discloses a plug-in coupling for connecting a fluid pipeline with a pipe. The plug-in coupling is provided at an angled piece of pipe, whose end can be connected with the fluid pipeline. The end of the fluid pipeline can be stuck together with the pipe and connected to the pipe via holding arms. An anti-twist protection holds the pipe in a defined angle position, so that the fluid pipeline and the pipe can be connected under a fixed angle of rotation in different relative position of rotation to each other. Separating the fluid pipeline and the pipe can be achieved by pressing together an oval ring, which surrounds the plug-in coupling. Due to the pressing together, retaining ribs disengage latches, therefore the fluid pipeline and the pipe can be separated.

The German patent DE 199 46 260 C 1 shows a quick coupling for tubes or pipes with a clutch housing. A plug nipple and a locking element are proposed, wherein locking and releasing of the locking occurs from one side of the clutch housing. The access to the quick coupling happens from the outside and a protection of pollution of the inner quick coupling is achieved.

The German patent application DE 34 40 783 A1 reveals a pipe coupler with a coupling nipple, surrounding by an abutment shoulder. The coupling nipple can be inserted into a coupling sleeve. A locking tappet engages in a closing position with two almost parallel legs sideways at the abutment shoulder. The legs attach in the area of their ends wedge-like arranged guide surfaces. The guide surfaces are arrange like that, that they impinge the weir gate into the direction of the closing position.

The U.S. Pat. No. 5,607,192 reveals a pipe connection for a water treatment system. The pipe connection contains an adapter from the water treatment system and a positioning means, which attaches a connecting means for the pipe at the water treatment system. The positioning means mounts the pipe with a C-shaped retaining section.

The European patent EP 1 559 944 B1 reveals a plug-in coupling for connecting a fluid pipeline with a pipe, as well. The end section of the pipe can be stuck together with the end section of the fluid pipeline, wherein elastic holding arms of an expandable part of a coupling ring make the fluid pipeline and the pipe stay connected. The part of the coupling ring has ratchet sections, spread over a sector of peripheral angle, which slip away and lock below the retaining rip when clutched in through the retaining rip by stretching the part of the coupling. By pressing manually the ends of its big axis, the part of the coupling can be stretchable, as well as the ratchet sections, for releasing the coupling. For safety reasons, to prevent, that the plug-in coupling can be released manually, the part of the coupling has at least three ratchet sections and the sector of peripheral angle is larger than 180°. If it is tried manually to deform the part of the coupling to release the coupling, at least one ratchet section will be engaged below the retaining rip.

The above described prior art does not allow that the plug-in connection is released between the two connected pipes in an easy manual way. In addition, the connection of the pipes is normally arranged in the outside section of the automobile and exposed to dirt. Dirt in the area of the connection of the two pipes complicates the release of the plug-in connection.

SUMMARY OF THE INVENTION

The object of the invention is to provide a plug-in connection for two pipes that allows an easy assembling and disassembly and guarantees a safe seat of the connection of the two pipes.

This object is achieved by a plug-in connection for a first pipe and a second pipe, comprising:
a retaining clip with two legs, both of which carry a locking element with a taper;
a guide for the retaining clip, which is formed at a free end segment of the first pipe;
a retaining region, which is formed at a free end segment of the second pipe, wherein the retaining region is a sectoral deepening with two opposing stops; and
a platform is provided with each locking element of the retaining clip, and the retaining clip, positioned in the guide, abuts in a form and force-locking manner with each locking element at the sectoral deepening of the retaining region and with each platform at the corresponding opposing stop.

An additional object of the invention is to provide a method for assembling a plug-in connection for two pipes, which allows an easy assembly and disassembly and guarantees a safe seat of the connection of the two pipes.

This object is achieved by a method for assembling a plug-in connection for a first pipe and a second pipe, which comprises the following steps:
pushing a free end segment of the second pipe into a free end segment of the first pipe;
inserting a retaining clip with two legs in a guide at the free end segment of the first pipe, so that two legs, each of which bears a locking element ; and
interacting of the locking elements in a form and force locking manner with a sectoral deepening and two opposing stops of a retaining region at the free end segment of the second pipe and thus connect the first pipe with the second pipe.

An additional object of the invention is to provide a method for easy and uncomplicated assembly and disassembly of a connection for two pipes The above object is achieved by a method for assembling and disassembling a plug-in connection for a first pipe and a second pipe, which comprises the following steps:
for assembling;
pushing a free end segment of the second pipe into a free end segment of the first pipe;

inserting a retaining clip with two legs in a guide at the free end segment of the first pipe, so that two legs, each of which bears a locking element;

interacting of the locking elements in a form and force locking manner with a sectoral deepening and two opposing stops of a retaining region at the free end segment of the second pipe and thus connect the first pipe with the second pipe; and for disassembling;

pressing a corrugated contact area of the retaining clip, located in the guide and the locking elements of the legs are disengaged from the retaining region at the free end segment of the second pipe via a wedge element of the guide in cooperation each with an abutment of the locking elements; and pulling apart the first pipe and the second pipe.

For the formation of the plug-in connection between the first pipe and the second pipe, a free end segment of the first pipe receives a free end segment of the second pipe. The plug-in connection has a retaining clip with two legs, each with a locking element. At the free end segment of the first pipe, a guide for the retaining clip is formed. At the free end segment of the second pipe, a retaining region is formed, wherein the retaining clip, located in the guide, cooperates with each locking element in a form and force-locking manner with a retaining section at the free end segment of the second pipe. The guide for the retaining clip has the advantage, that it can be inserted in the guide from the outside. If the retaining clip is attached to the guide, the region of the guide is sealed off from all exterior influences, like e.g. dirt or water. Therefore the retaining clip has two legs, each with a locking element. The locking elements act together in a form and force-locking manner with the sectoral retaining region at the free end segment of the second pipe, so that the first pipe can be connected with the second pipe. An abutment of each locking element is situated at a wedge element of the guide, so that a shielding to the outside is achieved by the retaining element. Another advantage of the invention is, that the retaining element can be released essentially without any tools. Therefore the first and the second pipe can be released in a simple way.

The end segment of the second pipe has a nose formed, which fits into a cut-out of the end segment of the first pipe, therefore an aligned positional arrangement of the first pipe into the second pipe is given. Because of the nose and the cut-out acting together, an anti-twist protection between the first pipe and the second pipe is achieved.

The retaining region at the free end segment of the second pipe formed two stops, which act together with a corresponding platform of every locking element of the retaining clip. Though the locking elements abut at least partially at one sector of the retaining region. The two opposing stops can be spaced to each other from 90° to 180°.

The free end segment of the second pipe bears an O-ring and an O-ring carrier. The O-ring and the O-ring carrier are located at the free end segment of the second pipe and are therefore protected there. The O-ring interacts in a sealing manner with an inside surface of the free end segment of the first pipe and an outside surface of the free end segment of the second pipe.

The two legs of the retaining clip are connected by a bracket and the bracket has a corrugated contact area on a reachable side by a user or a tool. Below the contact area at least one cut-out is formed, which fits into a lug of the guide for the retaining clip, if inserted into the guide.

Due to the inventive embodiment of the plug-in connection, a method for assembly and disassembly of the plug-in connection for the first pipe and the second pipe is simplified. Accordingly, the free end segment of the second pipe is inserted into the free end segment of the first pipe. The connection is saved by inserting a retaining clip in the guide at the free end segment of the first pipe. Accordingly, the retaining clip has two legs, each with a locking element. The locking elements coact in a form and force-locking manner with the retaining section of the free end segment of the second pipe, therefore the first pipe is connected with the second pipe.

The disassembly of the plug-in connection is accomplished by pressing the corrugated contact area, located at the retaining clip in the guide by a user or with a tool. Thus the locking elements of the legs are disengaged from the retaining region at the free end segment of the second pipe via a wedge element of the guide in cooperation with an abutment of the locking elements. The first pipe and the second pipe can be pulled apart and separated respectively.

The invention can be applied in an automobile, wherein the pipes, carrying a fluid, can be connected by the plug-in connection, according to the invention. The locking of the plug-in connection is made with the retaining clip. The locking area requires at least 180°.

The pipe with the associated end segment and the anti-twist protection is constructed so that a demolding from the injection mold tool can be carried out because a corresponding undercut exists in a locking area of at least 180°. In other locking areas of at least 90° to 180° a slight deformation is possible by a slider. This results in an advantage, that the flank (90°-180°) can be formed out of the tool without an undercut. The shown example, according to the invention, is less vulnerable to dirt and can be assembled and disassembled with low effort. For assembling the second pipe into the plug-in connection it is not necessary to press the retaining clip. For disassembly, the retaining clip has to be pressed accordingly and after that, the retaining clip releases the second pipe for disassembly. In addition, the inside O-ring is protected by the end segment of the first pipe and seals, in contrast to already known solutions, not from the outside, but from the inside.

The invention can be applied in all automobiles, in which a pipe or a tube has to be fixed at a container or in which generally two pipes have to be connected with each other. The two pipes can be e.g. made for delivering fuel. In case a flexible tube is used, it is reasonable to make the free end segments of the pipes or tubes dimensionally stable, for obtaining a sealed, stable and safe connection. Due to the invention, it is possible to connect two pipes in an easy manner and to release them as well.

BRIEF DESCRIPTION OF THE DRAWINGS

In the following, the invention is shown more precisely considering an execution example and the attached figures. It is shown in.

DETAILED DESCRIPTION OF THE PREFERRED EMBODIMENTS

Figure 1:
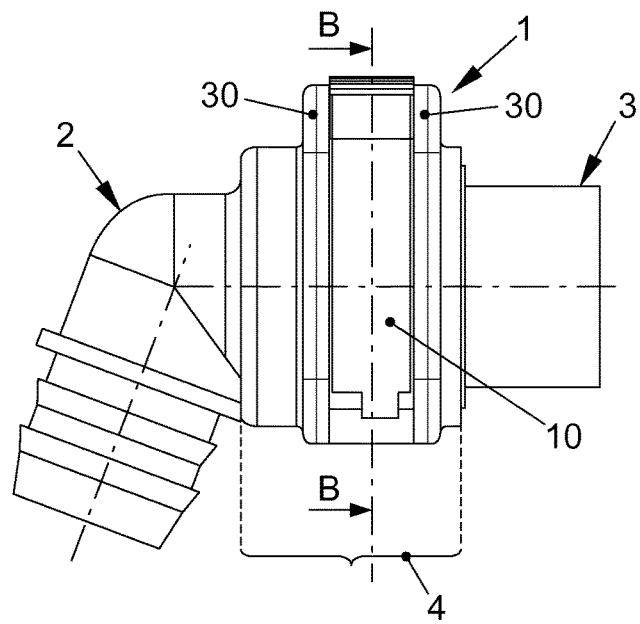
FIG. 1 is a side view of the first pipe, which is connected to the second pipe.

For same or equivalent elements of the invention, identical reference numerals are used. The shown embodiment depicts one possibility, how the plug-in connection 1, according to the invention, between a first pipe 2 and a second pipe 3 can be designed.

FIG. 1 shows a side view of the first pipe 2, which is connected to the second pipe 3. In the embodiment, shown here, the first pipe 2 is shown as an angled piece of pipe, which can be fixed to a container (not shown). This is not to be considered as a limitation of the invention. It is obvious for a person skilled in the art, that the present invention can be performed with an arbitrary formed or designed pipe pieces. In a guide 30 of the first pipe 2, a retaining clip 10 is inserted, which guarantees the connection between the first pipe 2 and the second pipe 3 in an appropriate way. The guide 30 is located at a free end segment 4 of the first pipe 2.

Figure 2:
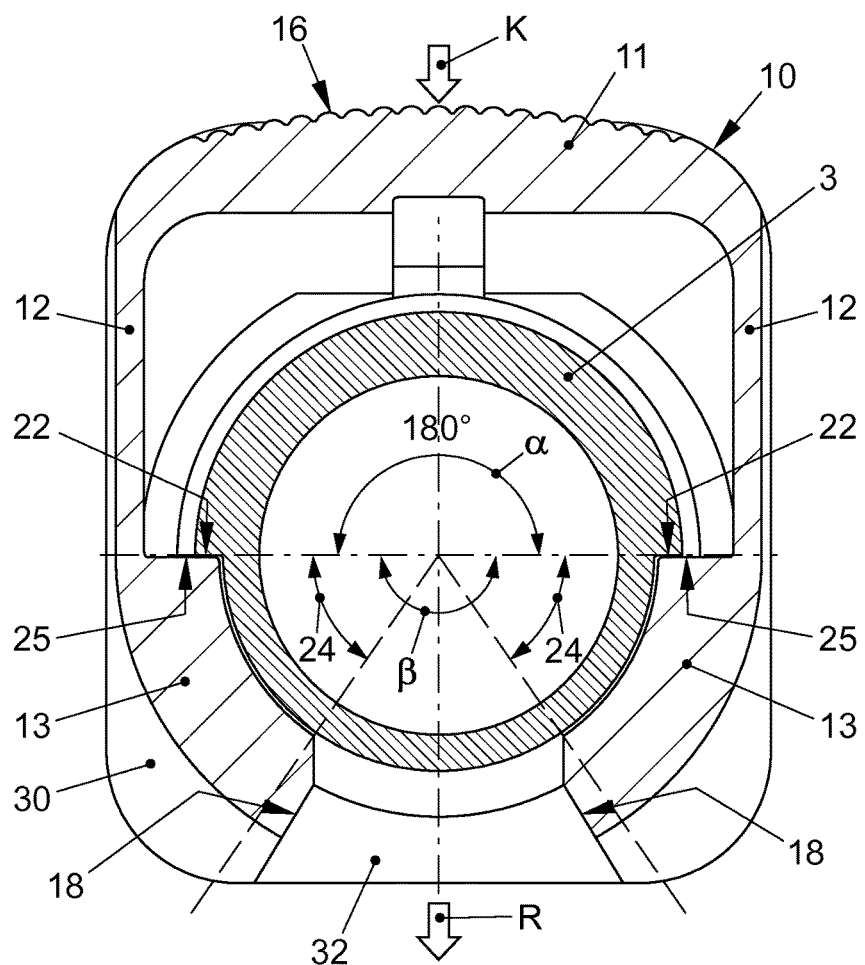
FIG. 2 is a sectional view along the cut line B-B, shown in FIG. 1, wherein the line of sight is directed into the direction of the second pipe.

In FIG. 2 a sectional view along the cut line B-B of FIG. 1 is shown, wherein the line of sight is directed into the direction of the second pipe 3. The retaining clip 10 is located in active position in the guide 30 and protects therefore the connection between the first pipe 2 and the second pipe 3. The retaining clip bears therefore two legs 12, each with a locking element 13. Both legs 12 of the retaining clip 10 are connected with each other by a bracket 11. The retaining clip 10 is basically of U-shaped design. The connecting bracket 11 possesses a corrugated contact area 16. The free end segment 5 of the second pipe 3 holds a retaining region 20, with which the locking elements 13 interact in a form and force-locking manner. The retaining region 20 formed at the free end segment 5 of the second pipe 3 has two opposing stops 22, which interact with a corresponding platform of each locking element 13 of the retaining clip 10. Besides, the locking elements 13 abut at least partially on a sector 24 of the retaining region 20. To release the connection between the first pipe 2 and the second pipe 3, a pressing force K hast to be exerted on the corrugated contact area 16 of the retaining clip 10. By exerting the pressing force, the legs 12 of the retaining clip 10 are moved downwards towards direction R. An abutment 18 of each locking element 13 slides at a wedge element 32 of the guide 30, by what the legs 12 are pulled apart. The two opposing stops 22 of the free end segment 5 of the second pipe 3 thus disengage with the platforms 25 of every locking element 13.

The two opposing stops 22 of the free end segment 5 of the second pipe are mounted to each other at an angle a between 90° and 180°. The platforms 25 of the two locking elements 13 of the retaining clip are attached under a complementary angle β. The two angles α and β amount favorable to 180°.

Figure 3:
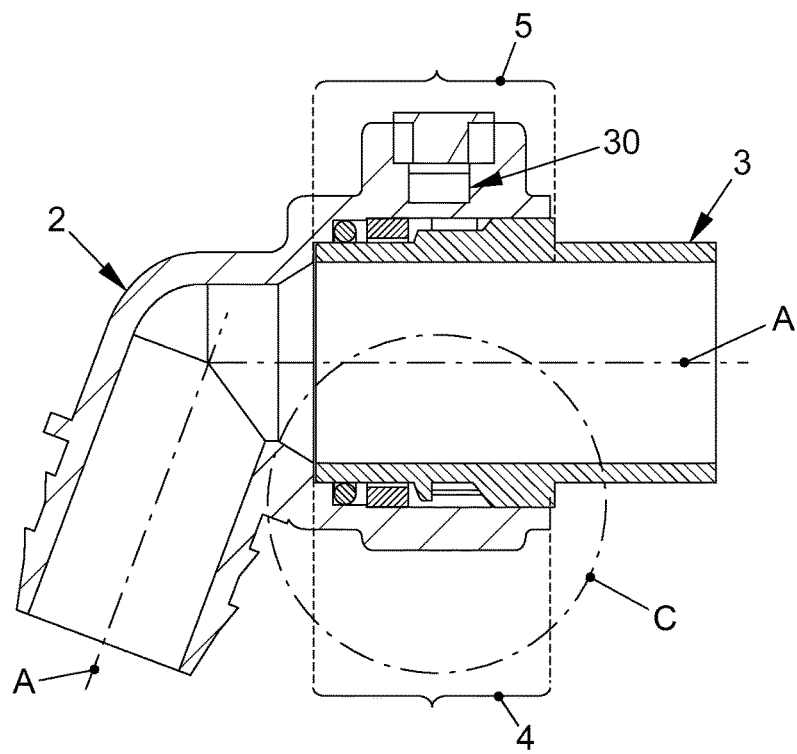
FIG. 3 is a sectional view of the plug-in connection, according to the invention along the axis of the first pipe and along the axis of the second pipe.

A sectional view of the plug-in connection 1, according to the invention along the axis A of the first pipe 2 and along the axis A of the second pipe 3 is shown in FIG. 3. The free end segment 4 of the first pipe 2 surrounds the free end segment 5 of the second pipe 3. A guide 30 is located at the free end segment 4 of the first pipe 2, which receives the retaining clip 10, to connect the first pipe 2 with the second pipe 3.

Figure 4:
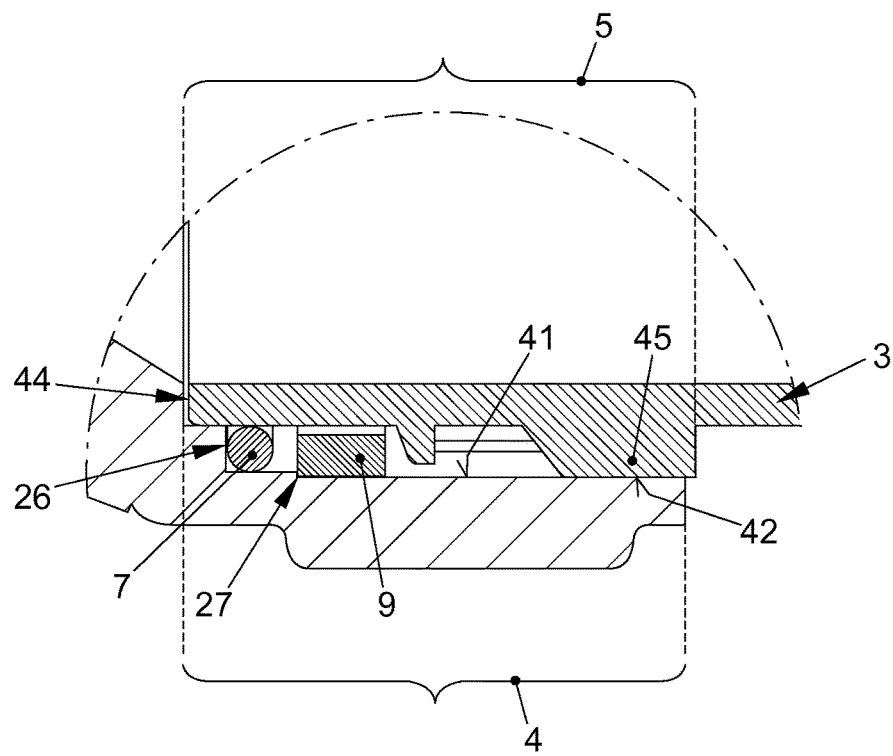
FIG. 4 is an enlarged view of the area, marked with a circle C in FIG. 3.

FIG. 4 shows an enlarged view of the area, marked with a circle C in FIG. 3. The free end segment 5 of the second pipe 3 bears an O-ring and a O-ring carrier 9. The O-ring abuts at a circumferential pedestal 26 of an inside surface 41 of the free end segment 4 of the first pipe 2. The O-ring carrier 9 abuts on a second circumferential pedestal 27 of the inside surface 41 of a free end segment 4 of the first pipe 2. Therefore the O-ring 7 and O-ring carrier 9 are safe in the free end segment 4 of the first pipe 2. The O-ring 7 interacts in a sealing manner with an inside surface 41 of the free end segment 4 of the first pipe 2 and an outside surface 42 of the free end segment 5 of the second pipe 3. The outside surface 42 of the free end segment 5 of the second pipe 3 is designed in such a way, that a radial free end 44 of the free end segment 5 of the second pipe 3 rests on a circumferential pedestal 26. In addition, the free end segment 5 of the second pipe 3 has a circumferential nose 45 in an area, in which pipe 3 continues, wherein the nose 45 abuts flat on the inside surface 41 of the free end segment 4 of the first pipe 2.

Figure 5:
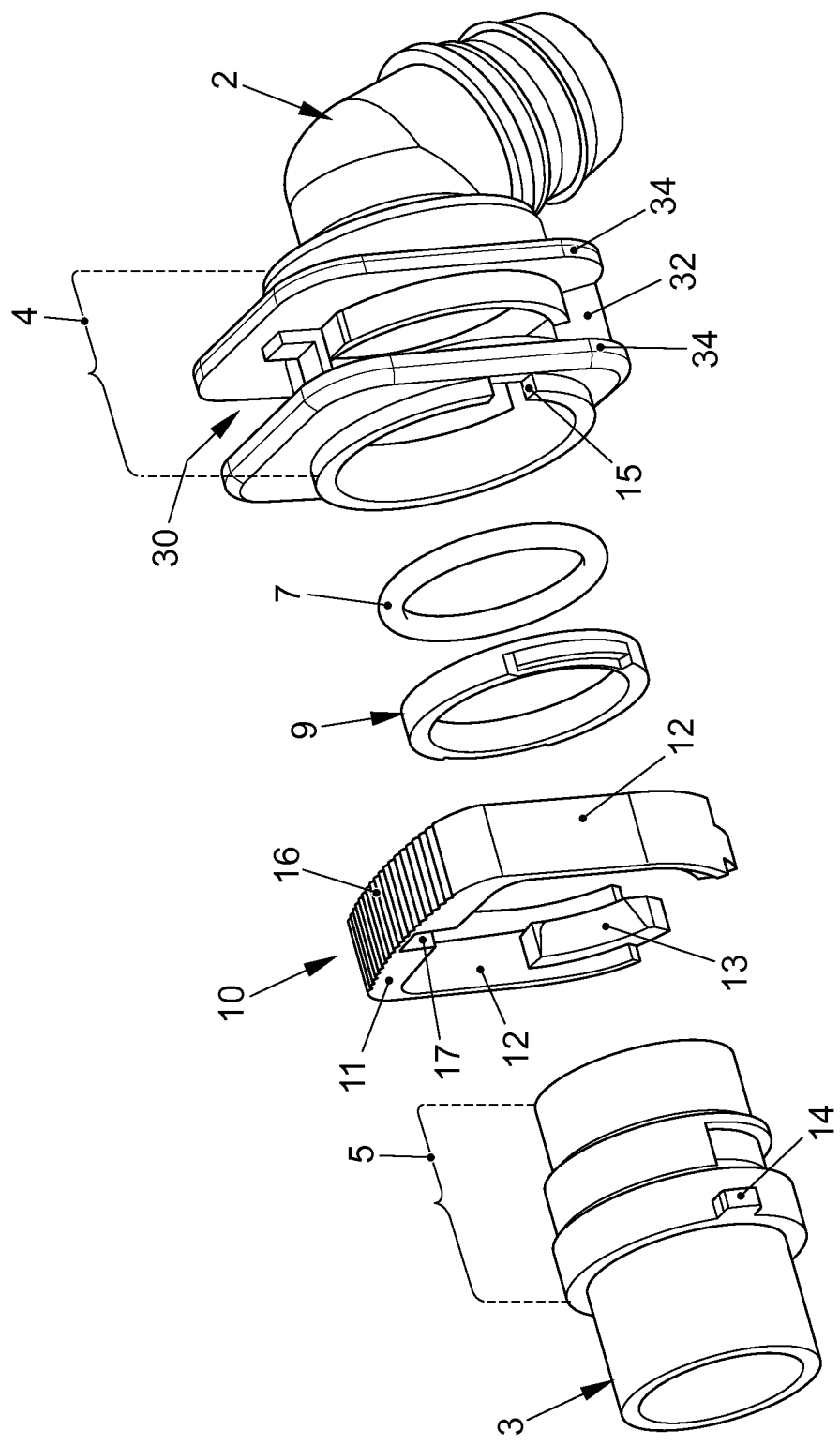
FIG. 5 is a perspective exploded view for presenting all components of the plug-in connection with the first and the second pipe.

FIG. 5 shows a perspective exploded view for presenting all components of the plug-in connection 1, which are necessary to build a reliable plug-in connection 1 between the first pipe 2 and the second pipe 3. The first pipe 2 is shown as an angled piece of pipe. A guide 30 is built for the retaining clip 10 at the free end segment 4 of the first pipe 2. The guide 30 consists basically of two plate-like elements 34, which are parallel in overall dimension. The plate-like elements 34 correspond in form and size approximately to the form and size of the U-shaped retaining clip 10. The retaining clip 10 consists of a connecting bracket 11 for the two legs 12. Below the contact area 16 of the bracket 11 a cut-out 17 is built, which interacts with a wedge element 32 in the guide 30, if the retaining clip 10 is inserted in the guide 30. The wedge element 32 is provided to be in the guide 30 between the plate-like elements 34. The wedge element 32 supports the disassembly of the first pipe 2 and the second pipe 3 in cooperation with the locking elements 13 of the retaining clip 10.

The free end segment 5 of the second pipe 3 bears the O-ring 7 and the O-ring 9 carrier. The free end segment 5 of the second pipe 3 also built a radial sticking out nose 14, which engages with the deepening at the free end segment 4 of the first pipe 2 during assembly for a connection in an aligned position between the first pipe 2 and the second pipe 3.

Figure 6A:
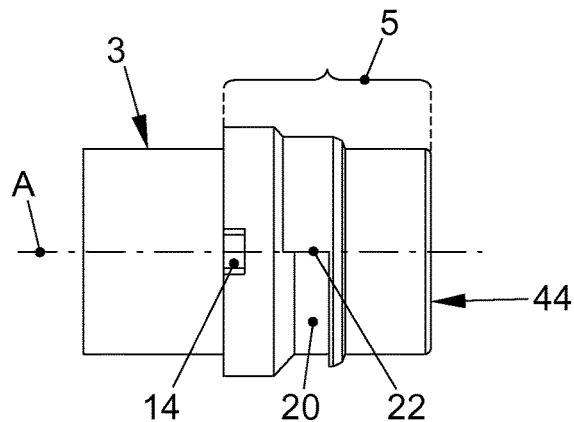
FIG. 6A-6C are alternative views of the second pipe.
Figure 6B:
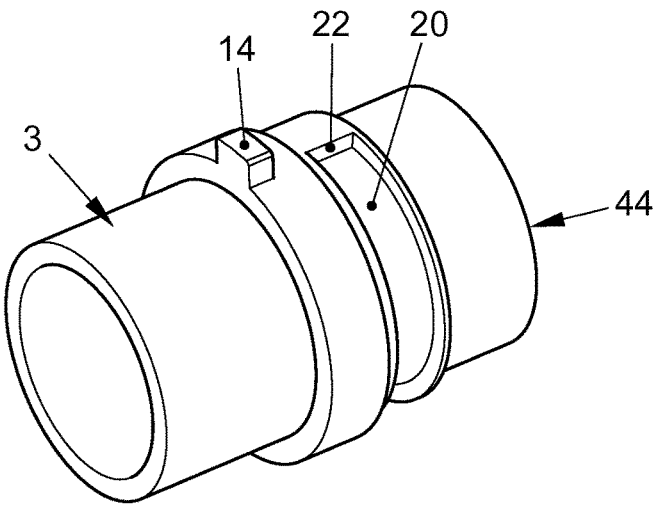
Figure 6C:
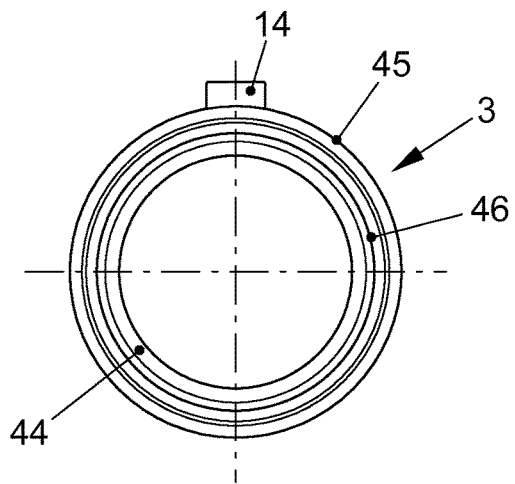

The FIGS. 6a-6c show different perspective views of the second pipe 3. As mentioned before, the radial sticking out nose 14 provides a connection in an aligned position between the first pipe 2 and the second pipe 3. The retaining region 20 shows in the free end segment 5 of the second pipe 3 a sectoral deepening, which is limited in radial direction by stops 22. FIG. 6c is depicted in the line of sight onto the free end segment 5 of the second pipe 3. Here an increase of the outer dimension of the free end segment 5 can be clearly recognized. Starting from the free end 44 of the free end segment 5 to the free end segment 5 of the second pipe 3, where the pipe 3 continues, the elements, built at the free end segment 5, like e.g. circumferential nose 45 or a circumferential assembly projection, show increasing external dimensions.

Figure 7A:
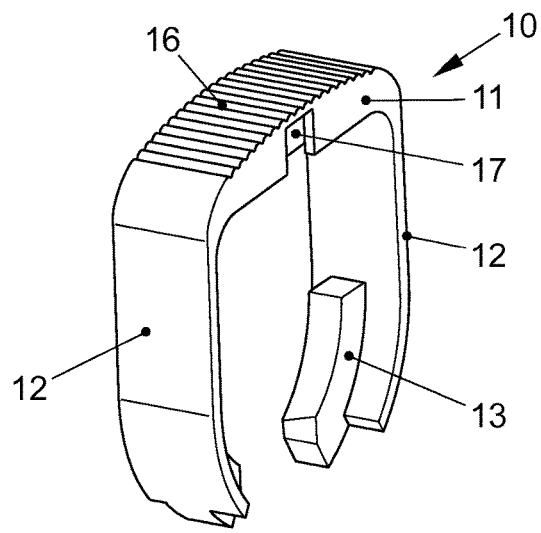
FIG. 7A-7E are alternative views of the retaining clip for the connection between the first and the second pipe.
Figure 7B:
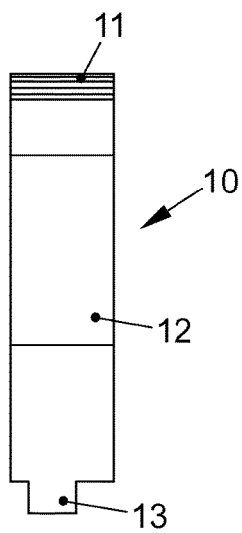
Figure 7C:
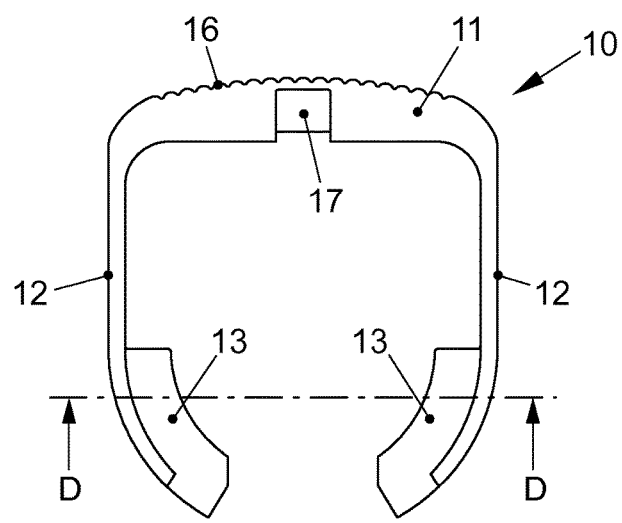
Figure 7D:
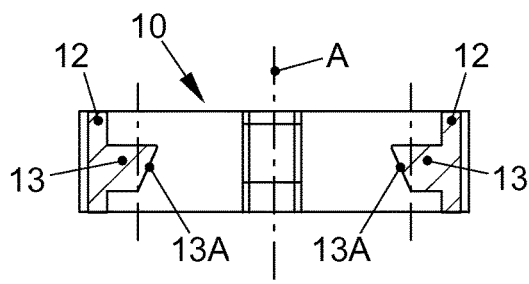
Figure 7E:
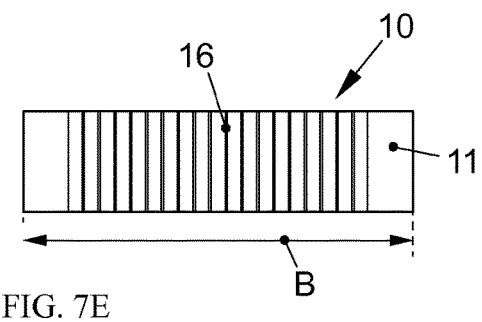

FIGS. 7a-7e different views of the retaining clip 10 for the connection between the first pipe 2 and the second pipe 3 are shown. The retaining clip 10 is essentially of U-shaped design. The bracket 11, connecting the two legs 12, bears a corrugated contact area 16. A pressing force is exerted on the corrugated contact area 16 on the retaining clip 10, so that the locking elements 13 if the legs 12 disengage with the retaining region 20 at the free end segment 5 of the second tube 3. The depiction of the FIGS. 7b and 7c show, that the locking elements 13 extend beyond the legs 12. Besides, the locking elements 13 built ring-shaped segments, so that the locking elements 13 adopt to the outside shape of the retaining region 20. The view, shown in FIG. 7d, is a sectional view along the cutline D-D, shown in FIG. 7c. The locking elements 13 have in direction of axis A a taper 13A, to therefore limit the abutment area in the retaining region 20. Like it can be seen in FIG. 7e, the corrugated contact area 16 extends over the major portion of width B of the retaining clip 10.

The invention is not limited to the described embodiments. Especially more components types and functions of the pipes to be connected, can be used. Changes of the embodiment of the invention can be carried out, without leaving the scope of protection of the claims.

LIST OF REFERENCE NUMERALS 1 plug-in connection
2 first pipe
3 second pipe
4 free end segment
5 free end segment
7 O-ring
9 O-ring carrier
10 retaining clip
11 bracket
12 leg
13 locking element
13A taper
14 nose
15 cut-out
16 contact area
17 cut-out
18 abutment
20 retaining region
22 stop
24 sector
25 platform
26 circumferential pedestal
27 circumferential pedestal
30 guide
32 wedge element
34 plate-like element
41 inside surface
42 outside surface
44 free end
45 circumferential nose
46 fitting ledge
A axis
B width
B-B cut line
C circle
K pressing force
R direction
α angle
β angle

What is claimed is:

1. A plug-in connection for a first pipe and a second pipe comprising:

a retaining clip with two legs, each leg carrying a locking element with a taper, each locking element of the retaining clip comprising a platform;
a guide for the retaining clip, the guide being formed at a free end segment of the first pipe;
a retaining region formed at a free end segment of the second pipe, wherein the retaining region is a sectoral deepening with two opposing stops; and
the retaining clip being positioned in the guide in such a way that each locking element abuts the sectoral deepening of the retaining region in a form and force-locking manner and each platform abuts at the corresponding opposing stop,
wherein the two opposing stops are arranged at an angle from 90° to 180° and the two platforms of the locking elements of the retaining clip are arranged at a complementary angle.

2. The plug-in connection according to claim 1, wherein the free end segment of the second pipe comprises a nose which engages with a cut-out of the free end segment of the first pipe for an aligned fitment of the first pipe and the second pipe is given.

3. The plug-in connection according to claim 1, wherein the locking elements abut at least partially on a sector of the retaining region.

4. The plug-in connection according to claim 1, wherein the free end segment of the second pipe bears an O-ring and an O-ring carrier, and the O-ring and the O-ring carrier are positioned and protected in the free end segment of the first pipe, wherein the O-ring interacts in a sealing manner with an inside surface of the free end segment of the first pipe and an outside surface of the free end segment of the second pipe.

5. The plug-in connection according to claim 1, wherein a bracket, connecting the two legs of the retaining clip, has a corrugated contact area formed, whereas below the contact area at least one cut-out is formed and the guide has a wedge element for the retaining clip, which engages a cut-out of the retaining clip when the retaining clip is inserted at the guide and provides an aligned correct positional arrangement of the retaining clip.

6. A method for assembling a plug-in connection for a first pipe and a second pipe the method comprising:

pushing a free end segment of the second pipe into a free end segment of the first pipe;
inserting a retaining clip with two legs in a guide at the free end segment of the first pipe, the retaining clip having two legs, each of the two legs bearing a locking element with a taper, each locking element of the retaining clip comprising a platform;
arranging two opposing stops of a retaining region at an angle from 90° to 180° and arranging the two platforms of the locking elements of the retaining clip at a complementary angle, said retaining region being a sectoral deepening with the two opposing stops formed at a free end segment of the second pipe; and
interacting the locking elements in a form and force locking manner with the sectoral deepening and the two opposing stops of the retaining region at the free end segment of the second pipe to connect the first pipe with the second pipe.

7. The method according to claim 6, wherein the free end segment of the second pipe has a nose and the free end segment of the second pipe is inserted in the free end segment of the first pipe, so that the nose fits into a cut-out of the free end segment of the first pipe, so that an aligned positional arrangement of the first pipe and the second pipe is achieved.

8. The method according to claim 6, wherein the retaining clip is inserted in the guide at the combined free end segments of the first pipe and the second pipe respectively, so that the locking elements at the legs of the retaining clip interact with the opposing stops formed at the retaining region of the second pipe and the locking elements abut at least partially at a sector of the retaining region.

9. The method according to claim 6, wherein the free end segment of the second pipe is provided with an O-ring and an O-ring carrier and the O-ring and the O-ring carrier are positioned and protected in the free end segment of the first pipe, wherein the O-ring interacts in a sealing manner with an inside surface of the free end segment of the first pipe and an outside surface of the free end segment of the second pipe.

10. A method for disassembling a plug-in connection between a first pipe and a second pipe, wherein the plug-in connection includes: a retaining clip with two legs, each leg carrying a locking element with a taper, each locking element of the retaining clip comprising a platform; a guide for the retaining clip formed at a free end segment of the first pipe; a retaining region formed at a free end segment of the second pipe, wherein the retaining region is a sectoral deepening with two opposing stops; and the retaining clip being positioned in the guide in such a way that each locking element abuts the sectoral deepening of the retaining region in a form and force-locking manner and each platform abuts at the corresponding opposing stop, the method comprising:
  pressing a corrugated contact area of a retaining clip, the retaining clip having two legs, each leg carrying a locking element with a taper, the corrugated contact area being located in a guide for the retaining clip, the guide being formed at a free end segment of the retaining clip;
  disengaging the locking elements of the two legs from the retaining region formed at the free end segment of the second pipe using a wedge element of the guide in cooperation with an abutment of the locking elements, wherein the two opposing stops are arranged at an angle from 90° to 180° and the two platforms of the locking elements of the retaining clip are arranged at a complementary angle; and
  pulling apart the first pipe and the second pipe.

\* \* \* \* \*